United States Patent
Loshbough

[15] 3,701,106
[45] Oct. 24, 1972

[54] DATA CHANGE DETECTOR

[72] Inventor: Richard C. Loshbough, Toledo, Ohio

[73] Assignee: Reliance Electric Company, Toledo, Ohio

[22] Filed: Dec. 7, 1970

[21] Appl. No.: 95,614

[52] U.S. Cl. ........................................340/172.5
[51] Int. Cl. ............................................G06f 3/04
[58] Field of Search......................340/146.2, 172.5

[56] References Cited

UNITED STATES PATENTS

| | | |
|---|---|---|
| 3,225,333 | 12/1965 | Vinal......................340/172.5 |
| 3,030,609 | 4/1962 | Albrecht..................340/172.5 |
| 3,290,647 | 12/1966 | Joseph et al. ...........340/146.2 |
| 3,334,334 | 8/1967 | Halpin.....................340/172.5 |
| 3,344,406 | 9/1967 | Vinal.......................340/172.5 |
| 3,571,807 | 3/1971 | Candy et al............340/172.5 |

*Primary Examiner*—Gareth D. Shaw
*Assistant Examiner*—Sydney R. Chirlin
*Attorney*—Thomas H. Grafton

[57] ABSTRACT

A detector for sensing change in data to determine whether or not the change is within tolerance and to determine whether or not data within tolerance remains in tolerance for a period.

11 Claims, 1 Drawing Figure

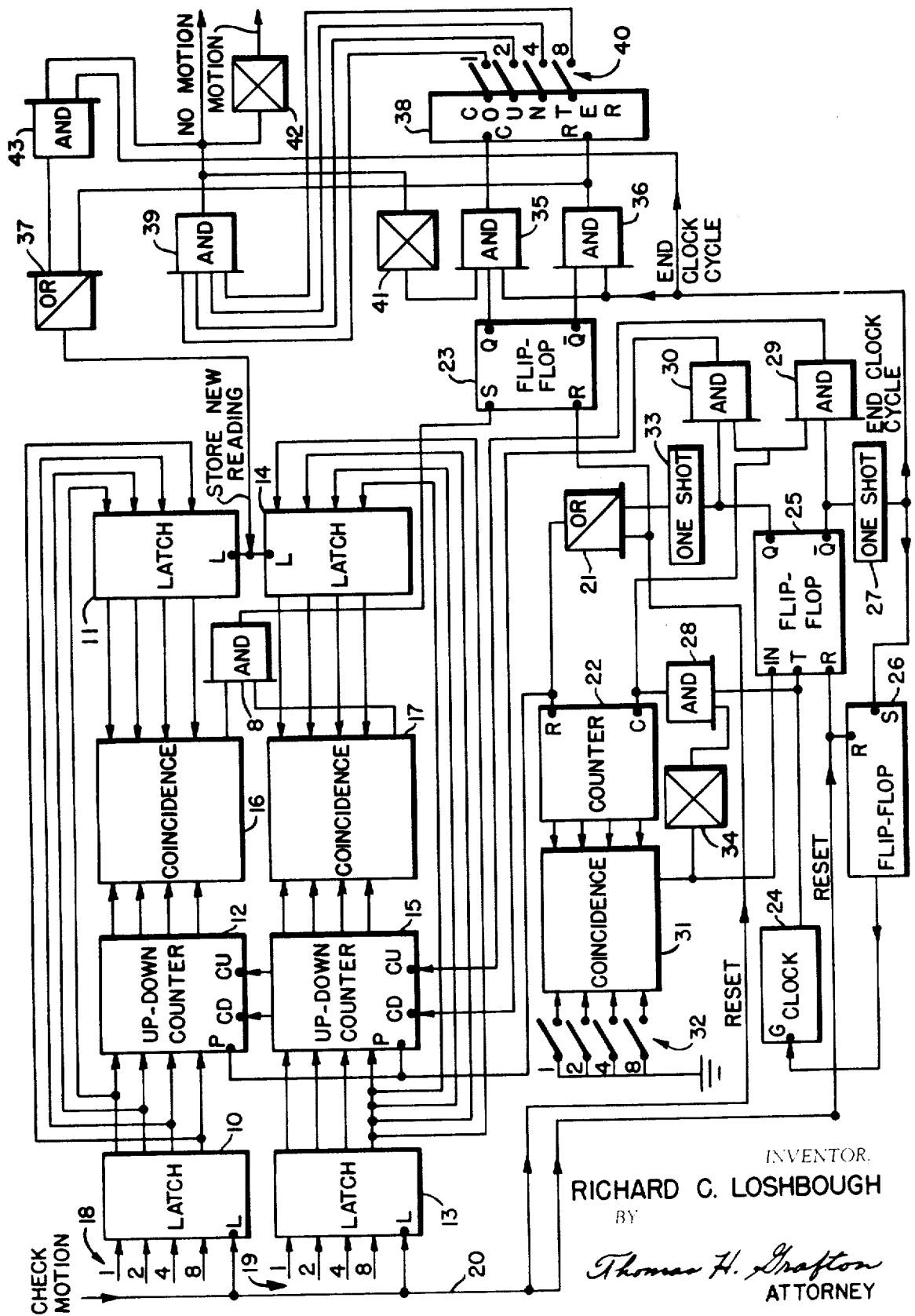

DATA CHANGE DETECTOR

BACKGROUND OF THE INVENTION

The invention relates to systems such as the digital voltmeter disclosed in U.S. Pat. No. 3,525,991, issued Aug. 25, 1970, in the name of Robert D. Kohler, such as the electronic computing weighing scale disclosed in U.S. Pat. No. 3,384,193, issued May 21, 1968, in the names of William C. Susor and Orval J. Martin and in U.S. Pat. No. 3,453,422, issued July 1, 1969 in the name of William C. Susor, or such as a shaft encoder. In the digital voltmeter and the weighing scale, data is updated periodically. In the shaft encoder, data is available continuously. In these systems detection of data change is required.

SUMMARY OF THE INVENTION

A prior motion detector is disclosed in U.S. Pat. No. 3,105,940, issued Oct. 1, 1963, in the names of Robert E. Bell and Clarence S. Simonds. The prior motion detector is responsive to the movement of weighing mechanism and provides MOTION and NO MOTION signals, but suffers from the basic weaknesses of having its sensitivity being dependent on the starting point, i.e., sensitivity depends on chart movement needed for photocell to detect next change in illumination, and its sensitivity is not satisfactorily adjustable, i.e., electrical sensitivity range is too narrow and mechanical sensitivity range requires a separate arrangement of photocell and chart graduations for each adjustment step. This type of motion detector is used in the weighing scale disclosed in the foregoing U.S. Pat. Nos. 3,384,193 and 3,453,422 (motion detector 27 in the patents). The detector for sensing change in data is used in place of the prior motion detector as a digital motion detector for sensing change in data to determine whether or not the change is within tolerance and to determine whether or not data within tolerance remains in tolerance for a period. Change outside tolerance is registered as MOTION and change within tolerance for the period is registered as NO MOTION.

The objects of this invention are to improve detecting devices for sensing change in data, such as motion detecting devices, to increase the precision of such devices, to provide a digital motion detecting device, and to provide motion detecting devices which have digitally variable sensitivities.

BRIEF DESCRIPTION OF THE DRAWING

The FIGURE is a block diagram of a digital motion detector embodying the present invention.

DESCRIPTION OF THE PREFERRED EMBODIMENT

In systems where data is updated on a periodic basis, e.g., five readings per second, such as the systems disclosed in the foregoing U.S. Pat. Nos. 3,453,422 and 3,525,991, the end of the readout cycles are signaled by cycle complete signals which are used as check data change or CHECK MOTION signals on a lead 20. In systems where data is continuously available such as in shaft encoders, a periodic pulse generator is used to create the check data change signals and initiate data sampling at such five times a second rate. The system disclosed in the foregoing U.S. Pat. No. 3,453,422 is a binary coded (1-2-4-8) decimal system; in the patent, computer weight entry is made as shown in FIG. 4 in a weight circuit which includes four AND gates 111-114 which receive the hundredths place parallel 1-2-4-8 binary coded decimal output from an electrical weight readout of a coded weight-responsive chart, four AND gates 115-118 which receive the tenths place parallel 1-2-a0-8 binary coded decimal weight output, four AND gates 119-122 which receive the units place weight output, and two AND gates 123-124 which receive the tens place weight output (25.00 pounds weighing scale capacity). When the detector is used to detect motion of such a binary coded system, the signals indicative of the readings being monitored in the two least significant decades are placed on primary storage input leads 18 and 19, respectively, e.g., the hundredths and tenths places in the foregoing weight readout of U.S. Pat. No. 3,453,422; MOTION and NO MOTION signals produced by the detector are used in the same manner as those signals which are produced by the motion detector 27 shown in the patent (no motion signals on lead 29 in the patent and motion signals on lead 31 in the patent).

The digital motion detector includes a quad latch (four flip flop) primary storage 10 which has its output leads connected to the inputs of a quad latch secondary storage 11 and also to the preset inputs of a presettable up-down counter 12, and a quad latch primary storage 13 which has its output leads connected to the inputs of a quad latch secondary storage 14 and also to the preset inputs of a presettable up-down counter 15. The output leads of the secondary storage quad latches 11 and 14 are connected, respectively, to the inputs of the one side of coincidence circuits 16 and 17 and the output leads of the counters 12 and 15 are connected, respectively, to the inputs of the other side of the coincidence circuits 16 and 17.

Binary coded (1-2-4-8) decimal signals indicative of the readings being monitored in the two least significant decades are placed on the primary storage input leads 18 and 19. A reading of 1243, for example, places an input on the "4" input lead of the quad latch 10, i.e., a decimal four, and inputs on the "1" and "2" input leads of the quad latch 13, i.e., a decimal three. At the completion of each readout cycle of the input device which may occur, for example, at the rate of five readings per second, a check motion signal is placed on the lead 20. The check motion signal is applied to latch terminals L of the primary storage quad latches 10 and 13 to latch in the current reading, i.e., a reading of 43 according to the foregoing example of 1243. The check motion signal also is applied to an OR gate 21, applied to the reset terminal R of an R-S flip flop 23 to reset the flip flop 23, and applied to the reset terminals R of a toggle flip flop 25 and an R-S flip flop 26 to reset the flip flops 25 and 26. The OR gate 21 is connected to the reset terminal R of a binary counter 22 to reset the counter 22 and to the preset terminals P of the up-down counters 12 and 15 to preset them to the numbers stored in the quad latches 10 and 13, respectively. The output of the flip flop 26 is connected to the gate terminal G of a clock 24. Resetting the flip flop 26 gates on the clock 24 which produces pulses until the flip flop 26 is set and ends the clock cycle.

The clock pulses are applied to the trigger terminal T of the toggle flip flop 25 and to the input of an AND gate 28. As long as a coincidence circuit 31 is not at coincidence, an inverter 34 connected to the output of the coincidence circuit allows clock pulses to pass through the AND gate 28 to the count terminal C of the binary counter 22 and to AND gates 29 and 30. The output leads of the binary counter 22 are connected to the inputs of one side of the coincidence circuit 31 and binary coded (1-2-4-8) decimal contacts 32 are connected to the inputs of the other side of the coincidence circuit 31. The output of the coincidence circuit 31 in addition to being connected to the input of the inverter 34 is connected to the input terminal IN of the toggle flip flop 25. The clock pulses in number corresponding to that set by the switches 32 are applied through the AND gate 29, which is held open by the clock pulses and by the flip flop 25 in its reset condition (Q terminal output), to the count up terminals CU of the up-down counters 12 and 15. The count up and also count down pulses to the counter 12 are created by the counter 15 and the pair form a two decade up-down counter. At coincidence between the setting on the contacts 32 and the counter 22, the inverter 34 prevents the AND gate 28 from sending clock pulses to the counter 22 and to the AND gates 29 and 30. The next clock pulse, after the coincidence signal is applied to the input terminal IN of the toggle flip flop 25, applied to the trigger terminal T of the toggle flip flop 25, causes it to flip to its set position Q to disable the AND gate 29 and to partially enable the AND gate 30. Output Q of the toggle flip flop 25 also fires a one shot 33 circuit supplying a pulse, which through the OR gate 21, resets the binary counter 22 to zero and presets the up-down counters 12 and 15 again to the numbers stored in the quad latches 10 and 13, respectively. Resetting the counter 22 cancels coincidence in the coincidence circuit 31 and the inverter 34 allows clock pulses to pass through the AND gate 28 once again. The enabled AND gate 30 (enabled by the clock pulses and output Q of the toggle flip flop 25) passes clock pulses in number corresponding to that set by the switches 32 to the count down terminals CD of the up-down counters 12 and 15. The next clock pulse, after the coincidence signal again is applied to the input terminal IN of the toggle flip flop 25, applied to the trigger terminal T of the toggle flip flop 25 causes it to flip to its reset position Q. When the toggle flip flop 25 flips to its reset position it also fires a one shot circuit 27 the resulting pulse from which is applied to the set terminal S of the flip flop 26. The flip flop 26 in its set condition gates off the clock 24 and ends the cycle.

The clock pulses which are applied to the count up terminals CU of the up-down counters 12 and 15 are added to the reading preset in the counters and each count is compared by the coincidence circuits 16 and 17 to the readings stored in the secondary storage quad latches 11 and 14. If coincidence is seen on any count, the coincidence circuits 16 and 17 produce a signal enabling an AND gate 8, which is connected to the set terminal S of the flip flop 23, setting the flip flop 23. After a number of count up pulses have been counted corresponding to the setting of the switches 32, the flip flop 25 toggles to the Q output and fires the one shot circuit 33. The OR gate 21 then presets the counters 12 and 15 and clock pulses are applied through the AND gate 30 to the count down terminals CD of the up-down counters 12 and 15. The clock pulses which are applied to the count down terminals are subtracted from the reading preset in the counters 12 and 15 and each count is compared by the coincidence circuits 16 and 17 to the readings stored in the secondary storage quad latches 11 and 14. Again if coincidence is seen on any count, the coincidence circuits 16 and 17 produce a signal enabling the AND gate 8 which sets the flip flop 23. If coincidence is not detected, the flip flop 23 in its reset state Q applies its output to an input of an AND gate 36. The AND gate 36 when enabled by the end of clock cycle signal applied to one of its inputs and by the reset output Q from the flip flop 23 applies its output to an OR gate 37 and to a reset terminal R of a binary counter 38. The output of the OR gate 37 is applied to the latch terminals L of the secondary storage quad latches 11 and 14 to store a new reading, i.e., the reading in the quad latches 10 and 13 is transferred and stored in the quad latches 11 and 14, respectively. The AND gate 35, when enabled by the end of clock cycle signal applied to one of its inputs, by the output Q from the set flip flop 23 applied to its second input, and by the output of an inverter 41 applied to its third input, applies its output to the count terminal C of the counter 38.

Coincidence count binary coded (1-2-4-8) decimal contacts 40 are connected to the outputs of the binary counter 38. The contacts 40 are in circuit with an AND gate 39 which is altered for each switch setting to be responsive to the respective number of closed switches, e.g., if switches "1" and "4" are closed, i.e., a decimal five, the AND gate 39 requires a signal on its inputs corresponding to the "1" and "4" contacts to provide a signal at its output. If the "1" and "4" switches 40 are closed, a count of five in the counter 38 places signals on all the operative inputs of the AND gate 39 which then provides a signal which signifies NO MOTION and is inverted by the inverter 41 to prevent any further clock pulses from entering the counter 38, stopping it at a count of five as set on the switches 40. The output of the AND gate 39 is inverted by an inverter 42. An output from the inverter 42 is the MOTION signal. The NO MOTION signal and the end of clock cycle signal enable an AND gate 43 which applies its output to the OR gate 37 to store a new reading as hereinbefore described.

In operation, using the foregoing example of current readout of 1243, i.e., 43 stored in the primary storage quad latches 10 and 13 and assuming an old reading of 68 is stored in the secondary storage quad latches 11 and 14, with the "1" and "2" tolerance contacts 32 closed, and the "1" and "4" coincidence contacts 40 closed, the new reading 43 is evaluated to determine whether or not its value is equal to 68 within plus or minus 3 (three selected by contacts 32). If the new reading falls within the tolerance zone, the coincidence condition is counted by the counter 38. When five consecutive coincidence conditions are counted (five selected by contacts 40), the NO MOTION signal is produced. In the example, since 43 does not fall within the tolerance zone, coincidence is not found and the MOTION signal is produced.

With the 43 reading stored in the quad latches 10 and 13 and the 68 reading stored in the quad latches 11 and 14, the check motion signal on the lead 20 resets the counter 22 and the flip flops 23, 25 and 26, and presets the 43 reading into the counters 12 and 15 through the OR gate 21. Resetting the flip flop 26 removes the hold on the clock 24. Clock pulses are counted by the counters 12, 15 and 22 until, at a count of three, coincidence is detected by the coincidence circuit 31, the counters 12 and 15 counting up from the 43 reading. No coincidence is seen by the coincidence circuits 16 and 17 on any count. The fourth clock pulse toggles the flip flop 25 which disables the AND gate 29, partially enables the AND gate 30, and applies a signal to the one shot circuit 33. The resulting pulse from the one shot circuit 33 through the OR gate 21 resets the counter 22 and again presets the 43 reading into the counters 12 and 15. Three clock pulses are applied through the open AND gate 30 to the up-down counters 12 and 15 which count down from the 43 reading. Again no coincidence is seen by the coincidence circuits 16 and 17 on any count. The fourth clock pulse toggles the flip flop 25 to the Q position which disables the AND gate 30 and applies a signal to the one shot circuit 27. The end clock cycle signal from the one shot circuit 27 causes the flip flop 26 to set and stop the clock 24. The AND gate 36 is enabled by the end clock cycle signal from the one shot circuit 27 and by the reset flip flop 23. The enabled AND gate 36 places its output on an input of the OR gate 37 latching the new reading in the quad latches 11 and 14, i.e., the 43 reading from the quad latches 10 and 13 is transferred to the quad latches 11 and 14. The 43 reading is now the target data.

If the next reading again is 1243, by the same process coincidence is detected by the coincidence circuits 16 and 17. The coincidence pulse applied through the AND gate 8 sets the flip flop 23 and one count is entered in the counter 38 through the AND gate 35. If the readings continue to be within three of 1243, five counts eventually are entered in the counter 38 and the NO MOTION signal is produced. As long as there is motion a new reading is stored in the quad latches 11 and 14 after every end clock cycle signal. When coincidence is seen (AND gate 8 enabled), no new reading is stored in the quad latches 11 and 14 until a NO MOTION signal is produced or unless motion occurs before the NO MOTION signal is produced. After a NO MOTION signal is produced, each new reading, if within the tolerance zone, is stored in the quad latches 11 and 14 by the action of the enabled AND gate 43. Thus, small changes in the new readings, i.e., those within the tolerance zone, do not cause a loss of the NO MOTION signal, i.e., the quad latches 11 and 14 track small changes in the input. The NO MOTION signal is retained until a large change in the new reading, i.e., one outside the tolerance limits, is encountered. Then coincidence is not attained by the coincidence circuits 16 and 17, the flip flop 23 remains in its reset Q state, the AND gate 36 resets the binary counter 38 cancelling the NO MOTION signal, and the OR gate 37 stores the new input.

The detector is useful for any digital output system where data change or motion detection is required, particularly where adjustable sensitivity is desirable (adjust sensitivity by contacts 32). When used with the weighing scale system which is disclosed in the foregoing U.S. Pat. No. 3,384,193 where data is updated on a periodic basis, e.g., 5 readings per second, all bits of the two least significant decades are monitored. This data is evaluated with respect to target data in the memory (quad latches 11 and 14). Target data is the previous data received when the system is in motion. The new data is evaluated to determine whether or not its value is equal to the target data within a selected tolerance band (contacts 32). If the new data falls within the tolerance band, the target data is frozen and one hit is counted by the counter 38. The target data that was used when the first hit was recorded is the target which is maintained. When the monitoring provides n (selected by contacts 40) consecutive hits, NO MOTION is registered. Adjustable sensitivity is important. For example, in the weighing scale system which is disclosed in the foregoing U.S. patents, vibration discrimination is a requirement. Small scale movements due, for example, to vibrations caused by printing equipment must be ignored while large scale movement due to changes in load upon the scale must be detected. The adjustable sensitivity permits the motion detecting to be adapted to the environment of each particular installation.

Once NO MOTION has been recorded, newly received data is transferred from primary storage 10 and 13 to secondary storage 11 and 14 to become target data after being evaluated for falling within the tolerance band. This feature assures that the target is centered on the static data value. MOTION is detected whenever a data update does not fall within the tolerance band. When MOTION is detected, the counter 38 which monitors the number of consecutive new data hits is reset to zero and the new data is transferred from primary storage 10 and 13 to secondary storage 11 and 14.

It is to be understood that the above description is illustrative of this invention and that various modifications thereof can be utilized without departing from its spirit and scope.

Having described the invention, I claim:

1. A detector for sensing change in data comprising, in combination, primary storage means for storing current data, secondary storage means connected to the primary storage means for storing target data, current data becoming target data when transferred from primary to secondary storage, means for determining coincidence between current and target data within a tolerance band, means for counting to a predetermined number consecutive times coincidence is determined, and means responsive to a determination of no coincidence or to reaching said predetermined number for transferring data from primary to secondary storage, whereby the determination of no coincidence signifies data change and reaching the predetermined number signifies no data change.

2. A detector according to claim 1 wherein switch means are provided for adjusting the width of the tolerance band.

3. A detector according to claim 1 wherein switch means are provided for adjusting the size of the predetermined number.

4. A detector according to claim 1 wherein means are provided responsive to the determination of coincidence following the reaching of said predetermined number for transferring data from primary to secondary storage.

5. A detector for sensing change in data comprising, in combination, means for determining whether or not change in data is within a tolerance band, and means for counting to a predetermined number consecutive times data is within the tolerance band, whereby reaching the predetermined number signifies no data change.

6. A detector for sensing change in data comprising, in combination, primary storage means for storing current data, secondary storage means connected to the primary storage means for storing target data, current data becoming target data when transferred from primary to secondary storage, means for determining coincidence between current and target data, means for counting to a predetermined number consecutive times coincidence is determined, and means responsive to a determination of no coincidence or to reaching said predetermined number for transferring data from primary to secondary storage.

7. A detector according to claim 6 wherein means are provided responsive to the determination of coincidence following the reaching of said predetermined number for transferring data from primary to secondary storage.

8. A detector for sensing change in digital readout data comprising, in combination, means for applying check data change signals to the detector to initiate data sampling, primary storage means for storing current data, secondary storage means connected to the primary storage means for storing target data, current data becoming target data when transferred from primary to secondary storage, means responsive to said check signals for determining coincidence between current and target data within a tolerance band, means for counting to a predetermined number consecutive times coincidence is determined, and means responsive to a determination of no coincidence or to reaching said predetermined number for transferring data from primary to secondary storage, whereby the determination of no coincidence signifies data change and reaching the predetermined number signifies no data change.

9. A detector for sensing change in digital readout data comprising, in combination, means for applying check data change signals to the detector to initiate data sampling, means responsive to said check signals for determining whether or not change in data has occurred between samplings, and means for counting to a predetermined number consecutive times no data change has occurred.

10. A detector according to claim 9 wherein said means for determining whether or not change in data has occurred includes means providing a tolerance band within which said data is evaluated.

11. A detector according to claim 10 wherein switch means are provided for adjusting the width of the tolerance band.

* * * * *